United States Patent
Miyake

(10) Patent No.: US 6,659,152 B1
(45) Date of Patent: Dec. 9, 2003

(54) LAMINATOR

(75) Inventor: Eiichi Miyake, Hyogo (JP)

(73) Assignee: Sanei Giken Co., Ltd., Amagasaki (JP)

( * ) Notice: Subject to any disclaimer, the term of this patent is extended or adjusted under 35 U.S.C. 154(b) by 0 days.

(21) Appl. No.: 10/129,269

(22) PCT Filed: Nov. 8, 1999

(86) PCT No.: PCT/JP99/06194
§ 371 (c)(1), (2), (4) Date: May 3, 2002

(87) PCT Pub. No.: WO01/34393
PCT Pub. Date: May 17, 2001

(51) Int. Cl.$^7$ ................................. B30B 3/00
(52) U.S. Cl. ....................... 156/555; 156/582
(58) Field of Search ................. 156/555, 580, 156/581, 582, 583.1; 100/176, 327

(56) References Cited

U.S. PATENT DOCUMENTS

| | | | | |
|---|---|---|---|---|
| 4,310,365 A | * | 1/1982 | Elliott et al. | .................. 156/55 |
| 4,519,757 A | * | 5/1985 | Wittkopf et al. | ............. 425/143 |
| 5,058,496 A | * | 10/1991 | Wittkopf | ...................... 100/35 |
| 6,405,779 B1 | * | 6/2002 | Wittkopf | .................... 156/555 |

FOREIGN PATENT DOCUMENTS

| | | |
|---|---|---|
| JP | 5-57861 | 3/1993 |
| JP | 5-286102 | 11/1993 |

* cited by examiner

*Primary Examiner*—James Sells
(74) *Attorney, Agent, or Firm*—Wenderoth, Lind & Ponack, L.L.P.

(57) ABSTRACT

A laminator comprises a pair of pressure rolls 2 having a substrate 1 and a film 55 sandwiched therebetween and bearings 3 adapted to rotatably support opposite end portions of the pressure rolls. One end of a lever 7 is attached to a housing of each bearing. The other end of the lever 7 extends in an axial direction of the pressure roll 2 and is located inward of the bearing 3. A pressure-applying apparatus 14 applies force to the other end of the lever 7, and applies pressure through the bearing to the substrate 1 and the film 55 between the pair of pressure rolls 2. Further, the pressure-applying apparatus 14 generates bending moment which tends to cause the pressure rolls 2 to be projected toward each other. A shaft 16 is disposed in spaced parallel relation to the pressure roll 2. Extension arms 17 are formed in the housings of the bearings 3. The extension arms 17 are connected to the shaft 16, to thereby enable the shaft 16 to support the bearings 3. The housings of the bearings 3 are capable of pivotal movement about the axis of the shaft 16 and also capable of pivotal movement about the axis perpendicular to the axis of the shaft 16.

10 Claims, 9 Drawing Sheets

(b)

Fig.6
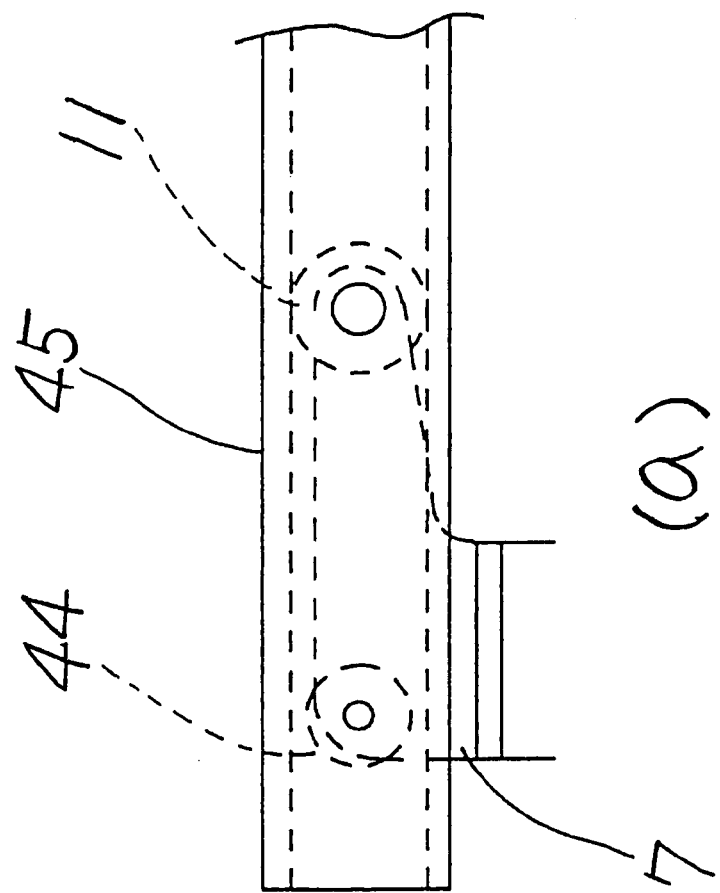
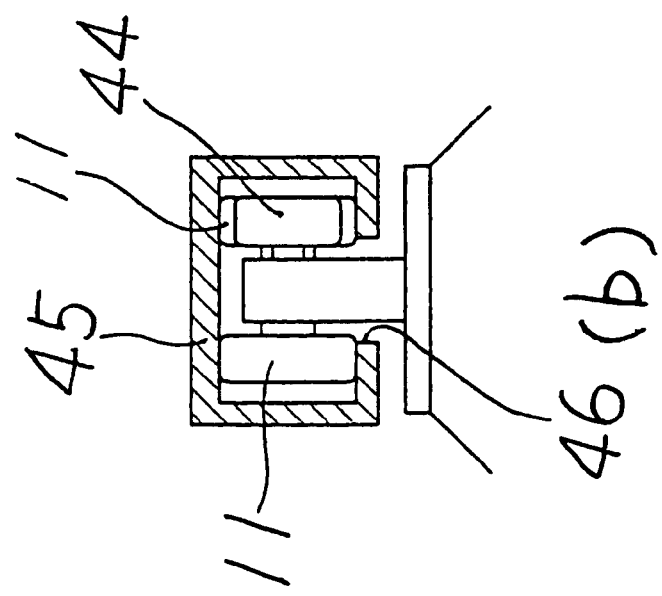

Fig. 8
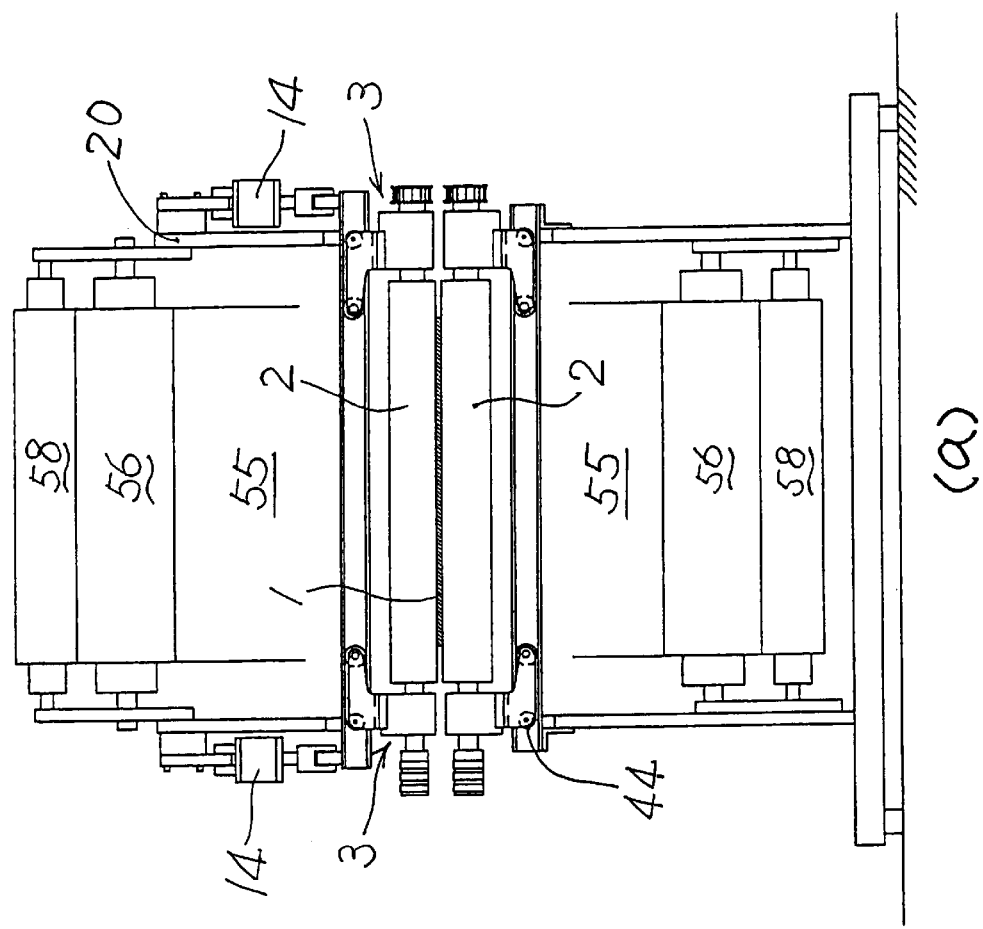
(a)
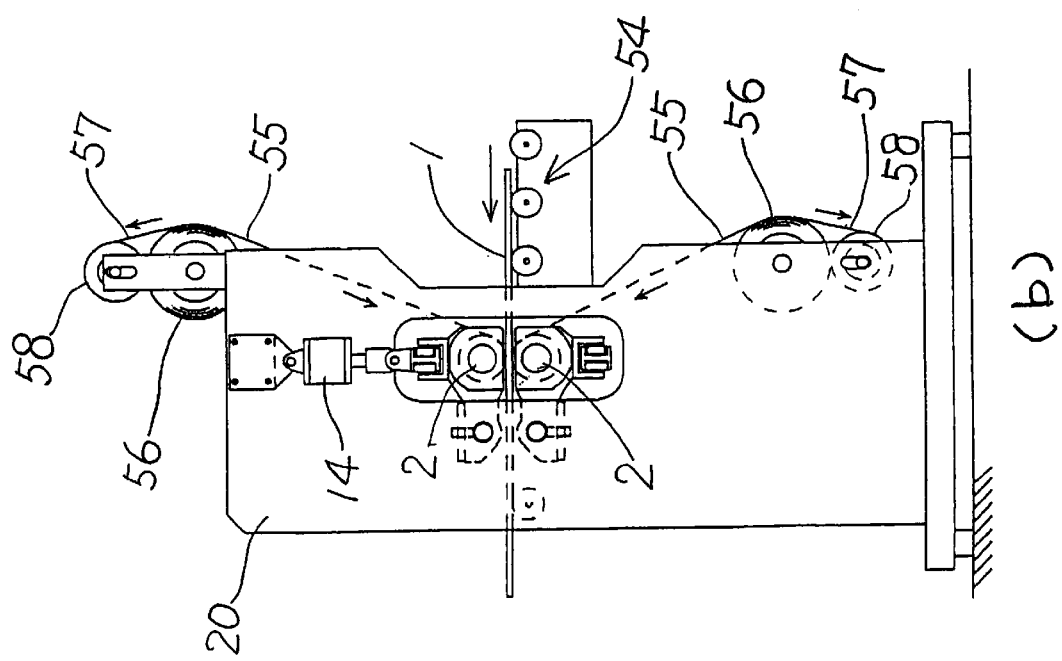
(b)

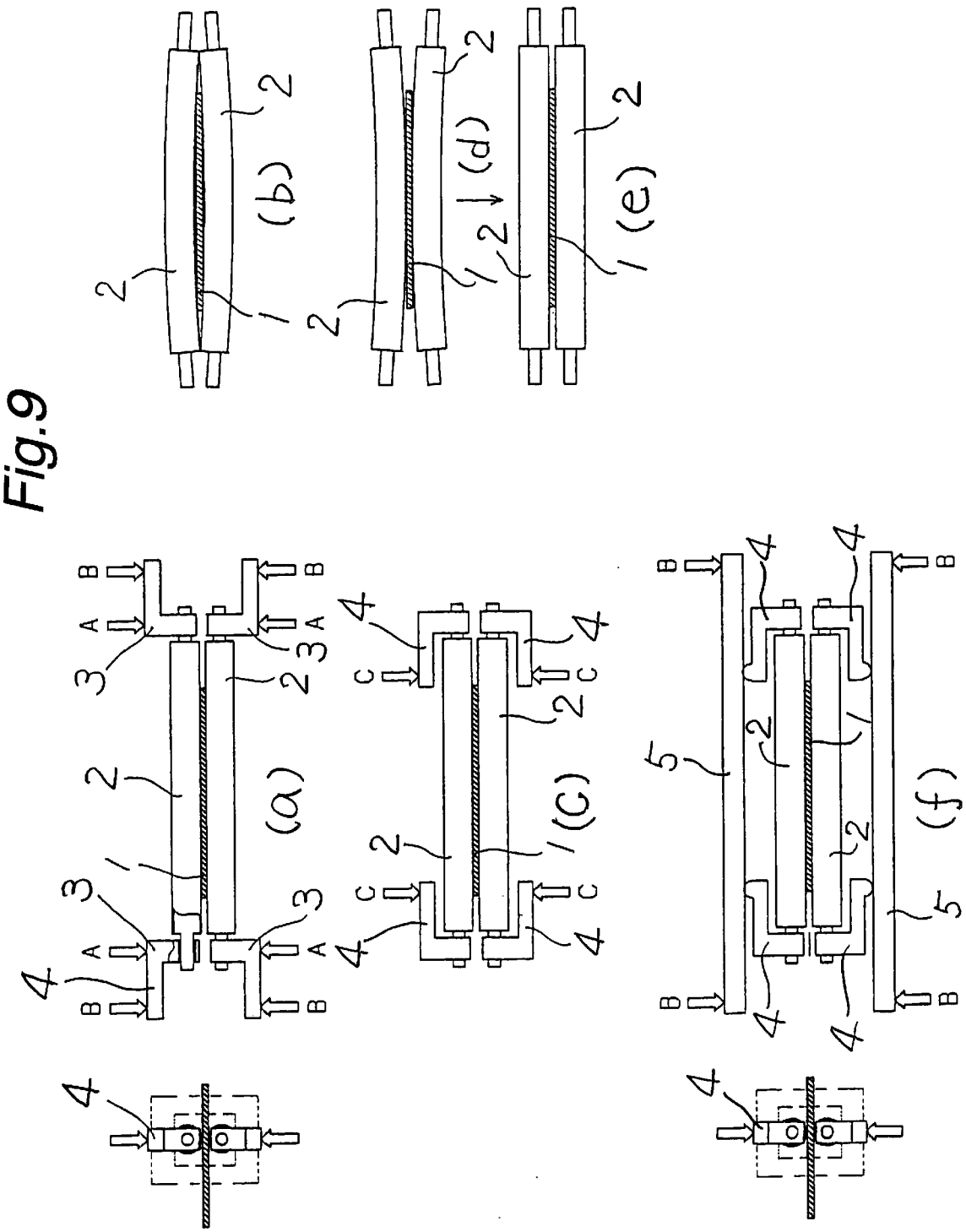

LAMINATOR

TECHNICAL FIELD

The present invention relates to a laminator for laminating a film on a substrate.

TECHNICAL BACKGROUND

There has been known a laminator using a pair of pressure rolls for laminating a film on one or both of opposite surfaces of a substrate. When a substrate which has been transferred toward the laminator is supplied to an area between the pressure rolls, a film is also supplied to the area between the pressure rolls, to thereby adhere the film to the substrate under pressure.

Pressure required for adhering the film to the substrate is applied by a pressure-applying apparatus such as an air cylinder apparatus, which applies force to bearings provided at opposite end portions of the pressure rolls.

FIG. 9 shows a set of diagrams for explaining an effect of bending of pressure rolls, which occurs when force is applied to bearings on the pressure rolls by a pressure-applying apparatus. In FIG. 9(a), force is directly applied, by pressure-applying apparatuses provided at positions A, to bearings 3 on opposite ends of a pair of pressure rolls having a substrate 1 sandwiched therebetween, or force is applied, by pressure-applying apparatuses provided at positions B, to the bearings 3 through levers 4 extending outward in an axial direction of the pressure rolls 2. In either case, the pressure rolls 2 having the substrate 1 sandwiched therebetween are bent due to a bending moment, which causes the pressure rolls to be recessed away from each other as shown in FIG. 9(b). Consequently, the pressure of the pressure rolls 2 becomes lower at a central portion of the substrate 1 and therefore, the film cannot be laminated on the substrate 1 under uniform pressure.

For laminating, for example, a photosensitive resist film on a substrate for a print circuit board substrate, it is strongly desired to adhere the film to the substrate under uniform pressure.

Therefore, a proposal has been made to extend the levers 4 inward in the axial direction of the pressure rolls 2 and apply force to the bearings 3 through the levers 4, by means of pressure-applying apparatuses provided at positions C axially inward of the bearings 3 (reference is made to Unexamined Japanese Patent Application Public Disclosure No. 10-146891). In this arrangement, the pair of pressure rolls 2 tend to be recessed away from each other as shown in FIG. 9(b), due to a bending moment generated depending on lateral loads acting on the bearings 3. On the other hand, the pressure rolls tend to be projected toward each other as shown in FIG. 9(d), due to a bending moment generated at the bearings 3 depending on the force acting on inner end portions of the levers 4 and the lengths of arms of the levers 4. These tendencies of bending in opposite directions are substantially canceled. Consequently, as shown in FIG. 9(e), the pressure rolls 2 can be held in a substantially straight condition to apply pressure to the substrate 1 and the film. The same effect as obtained in the case of FIG. 9(c) can also be obtained by applying force to the inner end portions of the levers 4 through bars 5, as shown in FIG. 9(f). The arrangement shown in FIG. 9(f) is advantageous in that pressure-applying apparatuses can be provided at outward positions B which have more space.

DISCLOSURE OF THE INVENTION

Based on this idea disclosed in Unexamined Japanese Patent Application Public Disclosure No. 10-146891, the present invention provides a specific arrangement for applying uniform pressure to a substrate and a film by means of a pair of pressure rolls.

For providing a specific arrangement, it is preferred that the following conditions be met:

(1) bearings provided at opposite end portions of the pressure rolls are capable of enabling smooth rotation of the pressure rolls and withstanding a large bending moment generated in the pressure rolls;

(2) the bearings are capable of maintaining their function even when imparted with a rotational motion due to the above-mentioned bending moment;

(3) the pressure rolls are substantially prevented from moving in an axial direction thereof and a direction perpendicular to the axial direction (a direction of travel of the substrate);

(4) a position at which force is applied to an end portion of a lever extending axially inward of the bearing is variable;

(5) the pressure roll associated with a pressure-applying apparatus is capable of moving toward and away from the pressure roll on the opposite side thereof in parallel relation;

(6) attachment and detachment of the pressure roll is easily conducted; and (7) the pair of pressure rolls are the same in terms of a mechanism comprising the pressure roll and the bearing associated therewith so that the pressure rolls are subject to the same deformation when force and a bending moment are applied to the pressure rolls by the pressure-applying apparatus.

In order to meet at least some of these conditions, the present invention provides a laminator for laminating a film on a substrate, comprising:

a pair of pressure rolls adapted to have the substrate and the film sandwiched therebetween;

bearings adapted to rotatably support end portions of each of the pressure rolls, each of the bearings comprising a bearing housing;

a lever having one end attached to the bearing housing and the other end located inward of the bearing in an axial direction of the pressure roll; and a pressure-applying apparatus for applying force to the other end of the lever, to thereby apply pressure through the bearing to the substrate and the film between the pair of pressure rolls, and generate bending moment which tends to cause the pair of pressure rolls to be projected toward each other, wherein the laminator further comprises:

a shaft for supporting the bearings, the shaft being disposed in spaced parallel relation to the pressure roll; and extension arms formed in the bearing housings and connected to the shaft so that the bearing housings are capable of pivotal movement about the axis of the shaft and also capable of pivotal movement about an axis perpendicular to the axis of the shaft.

The bearing housings may be connected to the shaft through bearings having spherical seats.

Opposite end portions of the shaft may be rotatably supported on side plates through rolling bearings, and a synchronization mechanism may be provided between the shaft and the extension arms connected thereto for restraining relative rotation between the shaft and the extension arms so as to synchronize movements of the bearing housings on opposite ends of the pressure roll during pivotal movement of the bearing housings about the axis of the shaft.

The laminator may be arranged, such that:

a roller is provided on the other end of the lever;

a bar in contact with the roller and extending in the axial direction of the pressure roll is provided; and the pressure-applying apparatus is provided outward of the bearing housing in the axial direction of the pressure roll and adapted to apply force to the roller on the other end of the lever in an indirect manner by applying force to the bar at a position in which the pressure-applying apparatus is provided.

A plurality of openings may be formed in the lever for receiving and supporting a shaft of the roller in a selective manner, the plurality of openings being arranged in the axial direction of the pressure roll, whereby a position of application of force to the roller can be changed by selecting one of the openings.

The laminator may be arranged, such that:

the bar has an I-shaped cross-section;

two levers extend from the bearing housing along opposite sides of a web portion of the I-shaped bar;

the roller provided on the other end of each of the two levers is located between two flange portions of the I-shaped bar on each of the opposite sides of the web portion of the I-shaped bar; and the web portion of the I-shaped bar includes a slot formed therein for enabling a shaft connecting the two rollers provided on the opposite sides of the web portion to extend therethrough.

The laminator may be arranged, such that:

the bar comprises a hollow bar having a rectangular outer configuration, the hollow bar including a longitudinally extending opening formed in at least a side wall thereof facing the pressure roll;

the rollers are provided one on each of opposite sides of the other end of the lever, the other end of the lever extending from the opening to an inside of the hollow bar; and the rollers are provided one on each of opposite sides of the opening inside the hollow bar.

The laminator may be arranged, such that:

the bearing housing comprises an outer first bearing housing element and an inner second bearing housing element;

the first bearing housing element comprises the extension arm and has a C-shaped opening for receiving the second bearing housing element;

the lever is attached to the first bearing housing element;

the second bearing housing element located on a side on which a drive mechanism for the pressure roll is provided comprises a plurality of rolling bearings for supporting an end shaft of the pressure roll, a gear provided axially outward of the rolling bearings and having a hollow shaft in which an outer end of the end shaft is fitted so that the hollow shaft and the outer end of the end shaft are rotatable as a single unit, and a plurality of rolling bearings for supporting the hollow shaft, the second bearing housing element being capable of being fixed in the C-shaped opening of the first bearing housing element; and the second bearing housing element on a side thereof opposite to the side on which the drive mechanism is provided comprises a plurality of rolling bearings for supporting an end shaft of the pressure roll, and is capable of being fixed in the C-shaped opening of the first bearing housing element.

A holding member engageable with the bar may be provided in the lever or the bearing housing separately from the roller provided on the other end of the lever, so as to maintain a position of the bearing housing when the pressure roll is removed from the bearing housing.

The laminator may be arranged, such that:

the shaft for supporting the bearings is provided for each of the bearing housings;

each of the shafts has an outer end thereof supported on the side plate through a rolling bearing;

each of the shafts has an inner end thereof connected to an end portion of the extension arm;

a synchronizing rod is provided in spaced parallel relation to the shafts, the synchronizing rod having opposite ends thereof rotatably supported on the side plates through rolling bearings; and the synchronizing rod and the end portions of the extension arms connected to the shafts are connected to each other through a link mechanism so that the bearing housings on opposite ends of the pressure roll move in synchronism with each other when the bearing housings pivotally move about the axes of the shafts.

BRIEF DESCRIPTION OF THE DRAWINGS

FIG. 1(a) is a partially sectioned plan view, and FIG. 1(b) is a partially sectioned front view. FIG. 1(c) is a side view.

FIG. 2(a) is a side view when pressure is applied. FIG. 2(b) is a side view when pressure is removed.

FIG. 3(a) is a plan view and FIG. 3(b) is a front view.

FIG. 4(a) is a front view before the pressure roll is removed. FIG. 4(b) is a front view after the pressure roll is removed.

FIG. 5(a) is a front view of the bar. FIG. 5(b) is a front view of the bar and the levers attached thereto.

FIG. 6 shows a bar having a form different from that of the bar shown in FIG. 5 and part of the lever attached thereto. FIG. 6(a) is a fragmentary front view. FIG. 6(b) is a partially sectioned side view.

FIG. 7(a) is a partially sectioned front view. FIG. 7(b) is a partially sectioned side view.

FIG. 8 shows an entire arrangement of the laminator. FIG. 8(a) is a front view, and FIG. 8(b) is a side view.

FIG. 9 shows a set of diagrams for explaining an effect of bending of the pressure rolls when force is applied to the bearings on the pressure rolls by the pressure-applying apparatus. FIGS. 9(a) to 9(e) are front views of the pressure rolls 2. Side views are also shown on the left side of FIGS. 9(a) and 9(f).

BEST MODE FOR CARRYING OUT THE INVENTION

Figure 1:
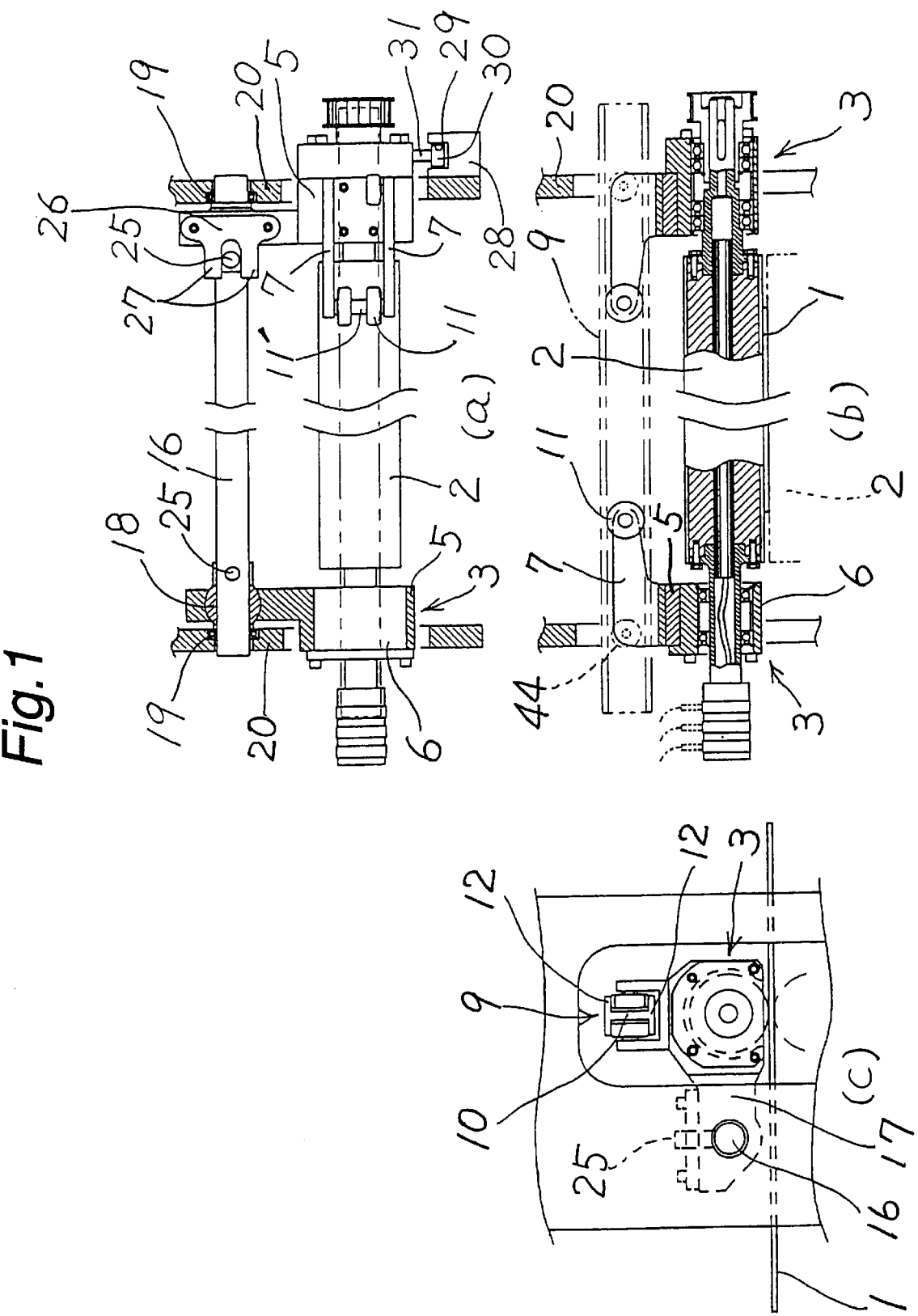
FIG. 1 shows, for easy understanding of a characteristic portion of a laminator of the present invention, a pressure roll and bearings therefor, with other structures in the vicinity thereof, according to an embodiment of the present invention.

FIG. 1 shows a characteristic portion of a laminator according to an embodiment of the present invention. A pair of pressure rolls 2 are vertically arranged. A substrate 1 and a film (not shown) are supplied to an area between the two pressure rolls 2 and sandwiched therebetween, to thereby cause the film to be laminated on the substrate 1. Bearings 3 are provided at opposite end portions of each pressure roll 2 so that the end portions are rotatably supported on the bearings 3. Each bearing 3 comprises a bearing housing including an outer first bearing housing element 5 and an inner second bearing housing element 6.

A pair of levers 7 are attached to each first bearing housing element 5. Each lever 7 has an outer end portion thereof bolted onto the housing element 5. using threaded holes 8 (see FIG. 3) formed in an upper surface of the first bearing housing element 5. Each lever 7 extends in an axial direction of the pressure roll 2, and an inner end portion of the lever 7 is located inward of the bearing 3.

When force toward the substrate 1 is applied to the inner end portion of the lever 7 by a pressure-applying apparatus, pressure is applied through the bearing 3 to the substrate 1 and the film between the pressure rolls 2. In this instance, as described above, a bending moment acting in such a manner as to cause the pressure rolls to be recessed away from each other and a bending moment acting in such a manner as to cause the pressure rolls to be projected toward each other are generated in the pressure rolls 2. These bending moments acting in opposite directions are substantially cancelled by each other, and the pressure rolls 2 can be held in a substantially staight condition to apply pressure to the substrate 1 and the film.

In the embodiment of FIG. 1, force is not directly applied to the inner end portion of the lever 7 by the pressure-applying apparatus. Instead, using a bar 9 provided above the pressure roll 2, which extends in the axial direction of the pressure roll 2, force is applied in an indirect manner through the bar 9 to the inner end portion of the lever 7. As shown in FIG. 1(c), the bar 9 has an I-shaped cross-section. As shown in FIGS. 1(b) and 5(b), the two levers 7 extend along opposite sides of a web portion 10 of the I-shaped bar 9.Each lever 7 has a roller 11 provided at the inner end portion thereof. The rollers 11 on the opposite sides of the web portion 10 of the I-shaped bar 9 are located between two flange portions 12 of the I-shaped bar 9. The rollers 11 make contact with one of the two flange portions 12.

Figure 5:
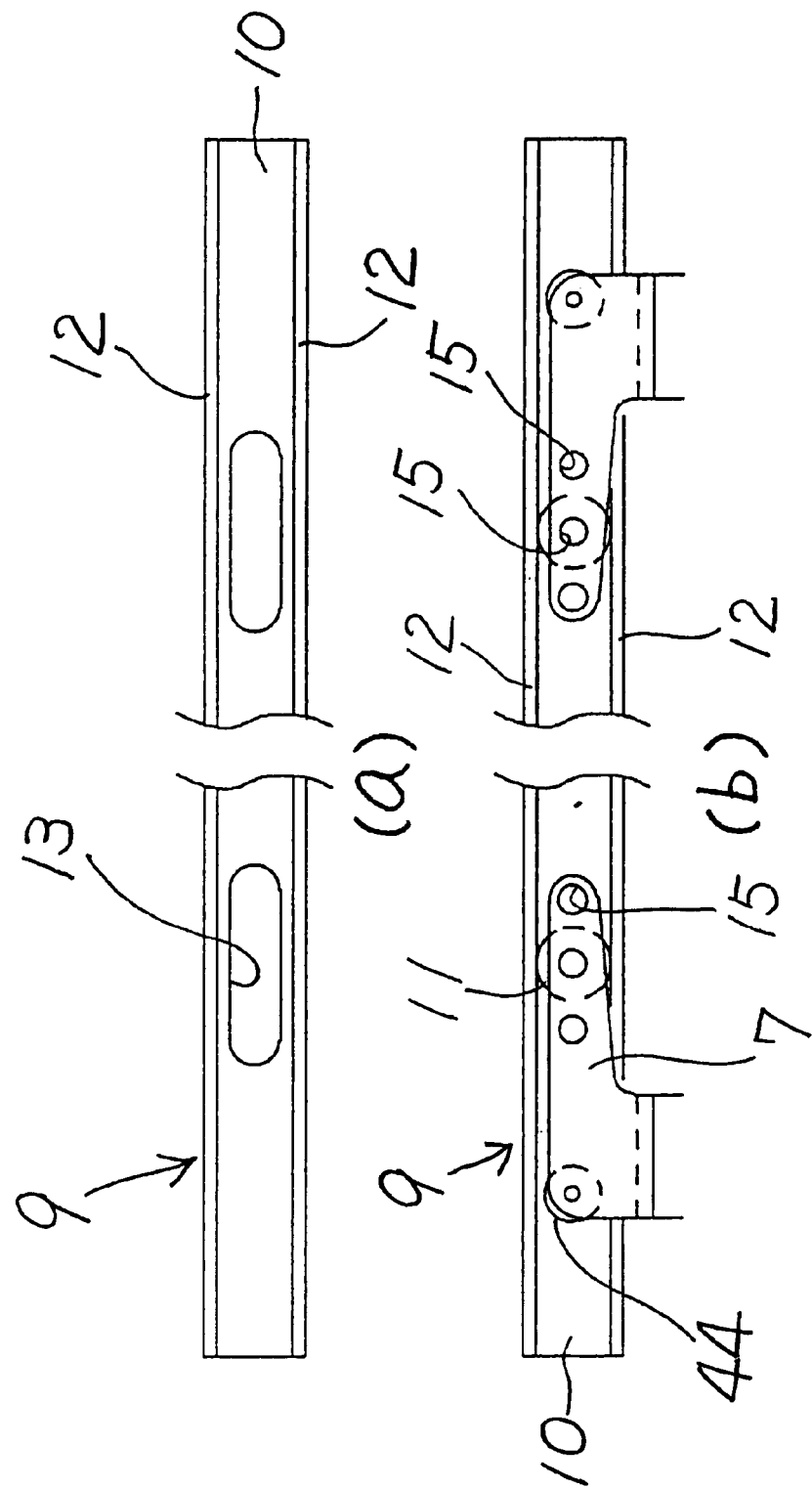
FIG. 5 shows a bar and part of levers.

In the embodiment shown in FIGS. 1 and 5. the two rollers 11 are connected to each other through a shaft 11'. The web portion 10 of the bar 9 has a slot 13 formed therein so as to enable the shaft 11' to extend therethrough. The shaft 11' is slidable in the slot 13.

As shown in FIG. 8(a), air cylinder apparatuses 14 as pressure-applying apparatuses are provided outward of the bearing housings of the bearings 3 in the axial direction of the pressure rolls 2. A lower end of a rod of the air cylinder apparatus 14 is connected to an upper surface of the bar 9. By extending the rods of the air cylinder apparatuses 14 and applying downward force to the bar 9, force is applied to the rollers 11 at the inner end portions of the levers 7 in an indirect manner.

As shown in FIG. 5, three openings 15 arranged in the axial direction of the pressure roll 2 are formed at the inner end portion of the lever 7 so as to receive and support the shaft 11' between the rollers 11 in a selective manner. Depending on which opening 15 is selected for receiving the shaft 11' between the rollers 11, a position of application of force from the bar 9 is changed and hence the length of arm of the lever 7 is changed. Consequently, the magnitude of the moment generated in the bearing 3 is changed.

As shown in FIGS. 1(a) and 1(c), a shaft 16 is provided in spaced parallel relation to the pressure roll 2. Extension arms 17 extending toward the shaft 16 are formed in the first bearing housing elements 5, and outer end portions of the extension arms 17 are attached through spherical bearings 18 to the-shaft 16. A bearing having a spherical seat other than a spherical bearing, for example, a self-aligning ball bearing may be used, instead of the spherical bearing 18.

The shaft 16 is rotatably supported on side plates 20 of a laminator body through rolling bearings 19. Thus, the bearings 3 are supported by means of the shaft 16. The housing of the bearing 3 is pivotable about the axis of the shaft 16 and also pivotable about the axis perpendicular to the axis of the shaft 16 (a longitudinal axis of the extension arm 17). Therefore, by operating the air cylinder apparatuses 14 as pressure-applying apparatuses, the pressure roll 2 having opposite ends thereof supported on the bearings 3 can be moved toward and away from the opposed pressure roll 2 and is capable of being slightly bent as a result of bending moment.

Figure 2:
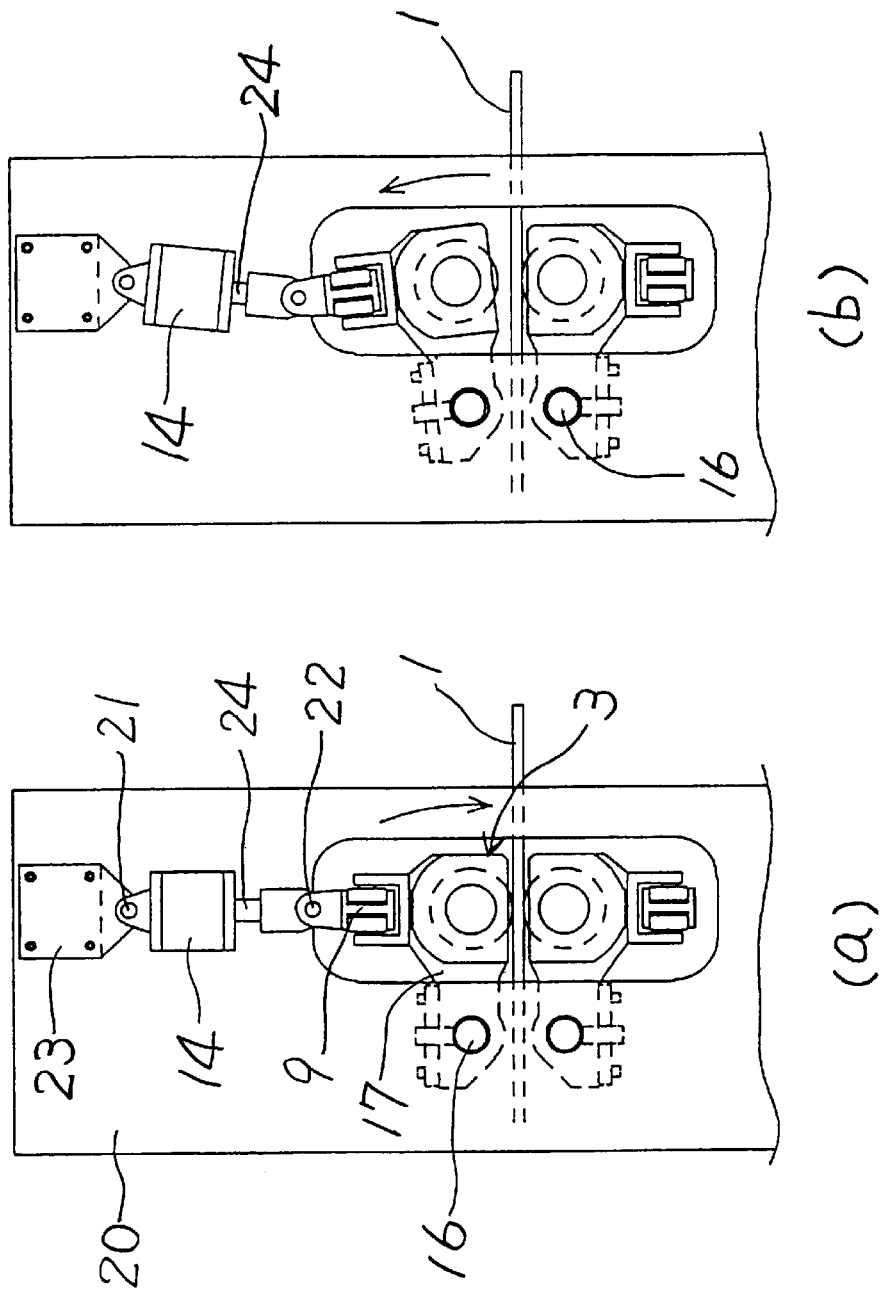
FIG. 2 shows operation of a pressure-applying apparatus and a motion of the pressure roll.

FIG. 2 shows motion of the bearing 3 and the pressure roll 2 caused by operation of the air cylinder apparatus 14. The air cylinder apparatus 14 is connected through joint pins 21 and 22 to a mounting member 23 on the side plate 20 and the bar 9. As shown in FIG. 2(a), by extending a rod 24 of the air cylinder apparatus 14. the upper bearing 3 and the upper pressure roll 2 are pivotally moved about the axis of the shaft 16 in a clockwise direction. Consequently, pressure is applied to the substrate 1 and the film (not shown) between the upper pressure roll 2 and the lower stationary pressure roll. As shown in FIG. 2(b), when the rod 24 of the air cylinder apparatus 14 is retracted, the bearing 3 and the pressure roll 2 are pivotally moved about the axis of the shaft 16 in a counterclockwise direction, and the substrate 1 is relieved from the pressure.

In FIGS. 1(a) and 1(c), a synchronization mechanism is shown, which synchronizes movements of the bearing housings on the opposite ends of the pressure roll 2 during pivotal movement of the bearing housings about the axis of the shaft 16. This synchronization mechanism comprises synchronization pins 25 extending perpendicularly from the shaft 16 and synchronization pin guides 26 fixed to the extension arms 17 of the first bearing housing elements 5. By fitting the synchronization pin 25 between two fingers 27 of the synchronization pin guide 26, the lateral extension arms 17 and hence the bearing housings are restrained from rotation relative to the common shaft 16. Therefore, with respect to pivotal movement about the axis of the shaft 16, the lateral, right and left, bearing housings move in synchronism with each other.

FIG. 1(a) shows a restraining mechanism for preventing the bearing 3 from moving in the axial direction of the pressure roll 2. This restraining mechanism comprises a guide groove 29 formed in a guide member 28 attached to an outer side of the side plate 20 and a guide roller 30 received in the guide groove 29. The guide roller 30 is attached through a shaft 31 to the first bearing housing element 5. The restraining mechanism comprising the guide groove 29 and the guide roller 30 prevents movement of the bearing 3 in the axial direction of the pressure roll 2, while it allows pivotal movement of the bearing 3 about the axis of the shaft 16, and pivotal movement of the bearing 30 about the axis perpendicular to the axis of the shaft 16 due to a bending moment. A pin member may be used, instead of the roller 30.

Figure 3:
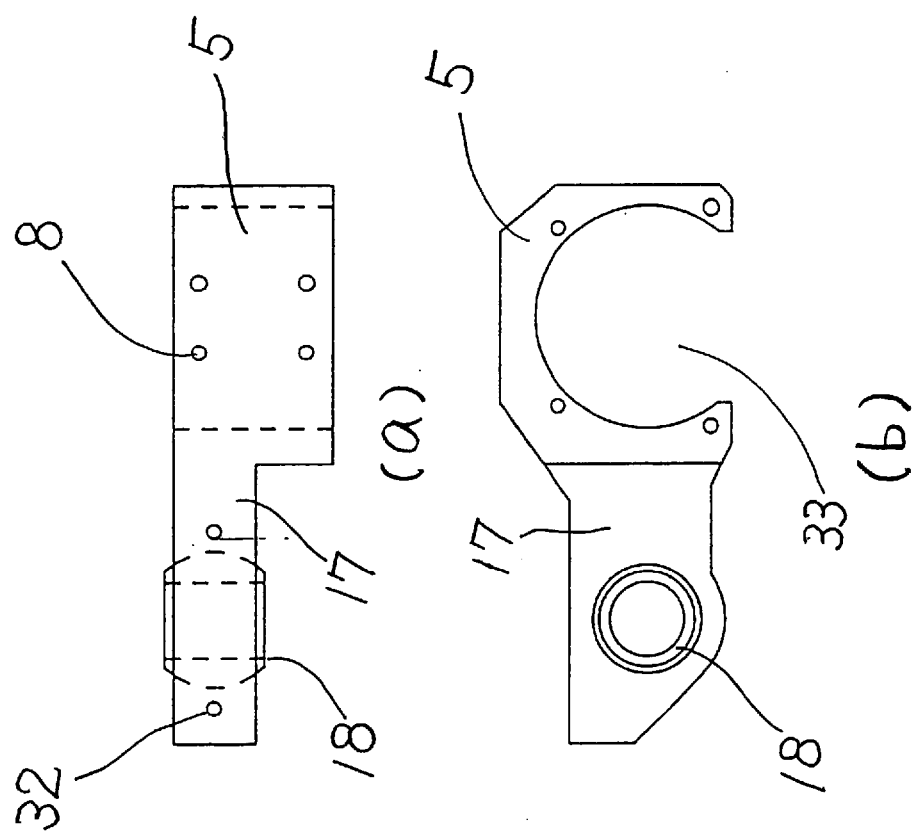
FIG. 3 shows an arrangement of a first (outer) bearing housing element.

FIG. 3 shows a detail of the first bearing housing element 5. Reference numeral 8 denotes threaded holes used for mounting of the levers 7. Reference numeral 32 denotes threaded holes used for mounting of the synchronization pin guide 26 shown in FIG. 1. A C-shaped opening 33 is formed in the first bearing housing element 5, so as to receive the second bearing housing element 6 in a slidable manner.

Figure 4:
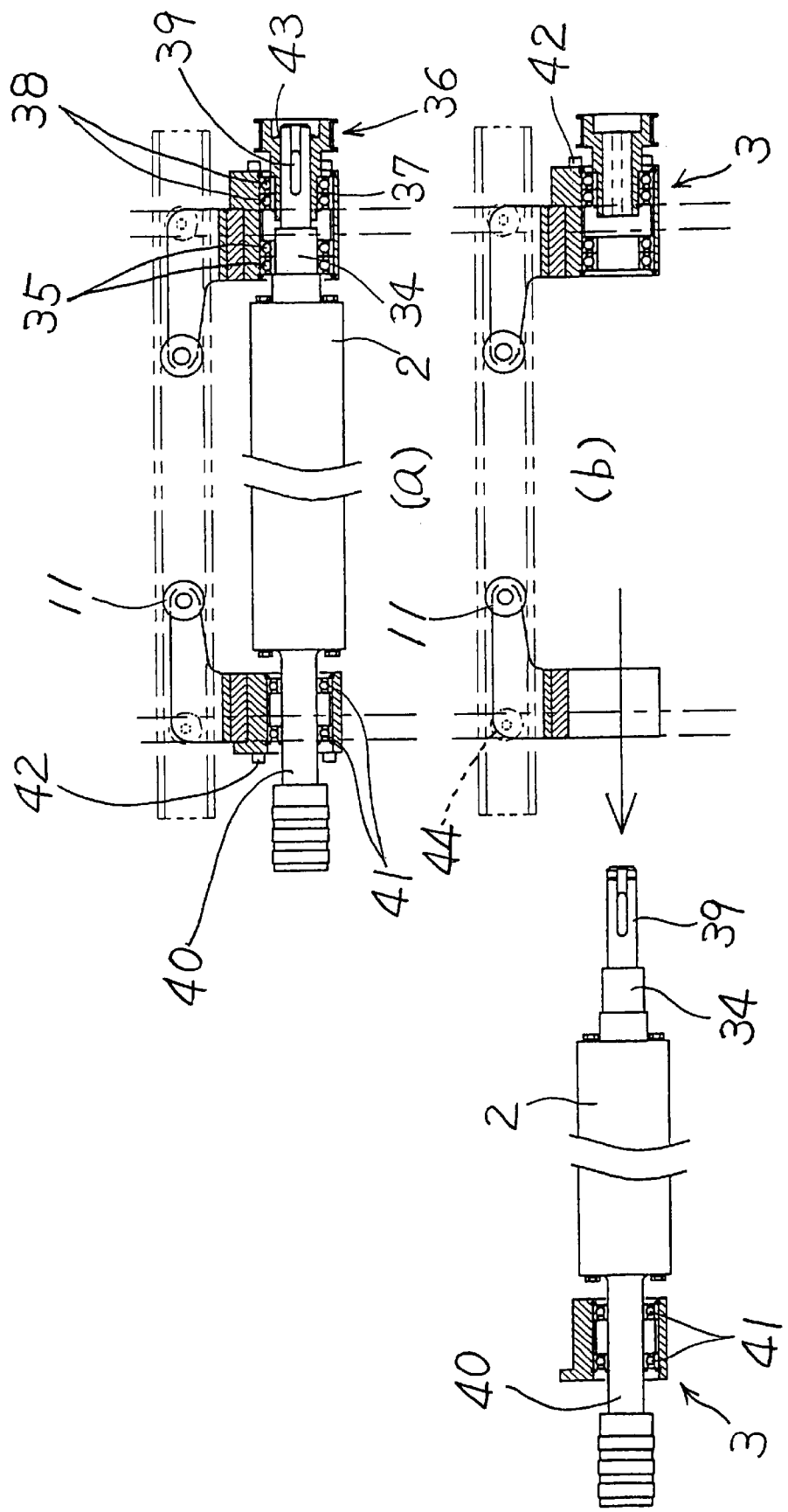
FIG. 4 shows how the pressure roll is removed.

With respect to the second bearing housing element 6 received in the C-shaped opening 3 of the first bearing housing element 5, the left-side second bearing housing element 6 and the right-side second bearing housing element 6 have slightly different forms, as shown in FIG. 4. The second bearing housing element 6 on the side on which a drive mechanism for the pressure roll 2 is disposed, that is, on the right side of FIG. 4(a), comprises a plurality of rolling bearings 35 for supporting an end shaft 34 of the pressure roll 2, a gear 36 disposed axially outward of the rolling bearings 35 and a plurality of rolling bearings 38 for supporting a hollow shaft 37 of the gear 36. An outer end 39 of the end shaft 34 of the pressure roll 2 is fitted into the hollow shaft 37 of the gear 36. Thus, the hollow shaft 37 and the outer end 39 of the end shaft 34 are capable of rotating together as a single unit. A drive means such as a toothed belt (not shown) is engaged with the gear 36.

The second bearing housing element 6 on the left side of FIG. 4(a) comprises a plurality of bearings 41 for supporting an end shaft 40 of the pressure roll 2.

Each of the left-side and right-side second bearing housing elements 6 is capable of being fixed in the C-shaped opening 33 of the first bearing housing element 5 by means of a screw member 42. As a retaining means for the pressure roll 2, a stop ring 43 such as a circlip is attached to the end shaft 39.

In order to pull out the pressure roll 2 in the axial direction as shown in FIG. 4(b), first, the stop ring 43 on an end of the end shaft 39 is removed. Subsequently, the screw member 42 which secures the left-side second bearing housing element 6 to the first bearing housing element 5 is removed. Then, the pressure roll 2 is pulled leftward, with the left-side second bearing housing element 6 remaining thereon.

Referring to FIGS. 1, 4, 5, 6 and 8, a roller 44 having a smaller diameter than the roller 11 is provided in the vicinity of a bent portion of the lever 7. The roller 44 functions as a holding member which enables the bearing housing to maintain substantially the same position before and after removal of the pressure roll 2 from the bearing housing. The diameter of the roller 44 is determined so that the roller 44 does not make contact with the flange portions 12 of the bar 9 during normal operation, so as to avoid impeding pivotal movement of the bearing housing about the axis perpendicular to the axis of the shaft 16. However, after the pressure roll 2 is removed from the bearing housing as shown in FIG. 4(b), the roller. 44 engages the lower flange portion 12 of the bar 9, to thereby prevent the bearing housing from lowering to a large extent, so that the position of the bearing housing remains substantially the same as that before removal of the pressure roll 2.

As a holding member, a pin member may be used, instead of the roller 44. Further, the roller 44 or pin member may be connected not to the lever 7 but to the bearing housing through a rod. That is, the roller 44 or pin member may be provided at a distal end of a rod extending from the bearing housing toward the bar 9.

FIG. 6 shows a bar according to another embodiment of the present invention. This bar 45 comprises a hollow member having a rectangular outer configuration. A side wall of the bar facing the pressure roll 2 includes a longitudinal opening 46 formed therein. The above-mentioned rollers 11 are provided one on each of opposite sides of the inner end portion of the lever 7. The portion between the bent portion and the inner end portion of the lever 7 extends from the opening 46 to the inside of the bar 9. The rollers 11 are provided one on each of opposite sides of the opening 46. The small-diameter roller 44 as a holding member is provided at the bent portion of the lever 7. In FIG. 4(b), one roller 44 is provided on only one side of the inner end portion of the lever 7. However, two rollers 44 may be provided one on each of opposite sides of the inner end portion of the lever 7.

Figure 7:
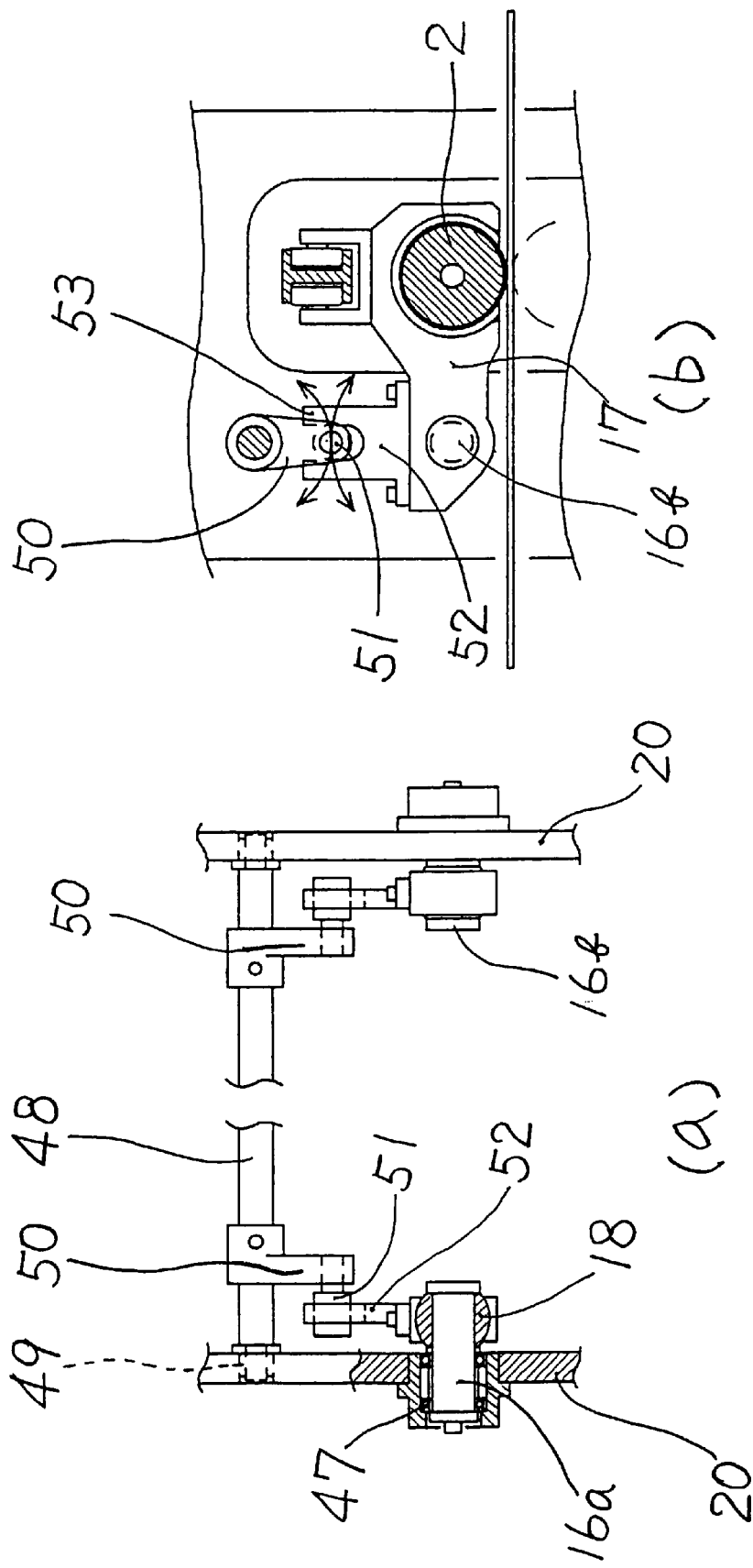
FIG. 7 shows a synchronization mechanism having a form different from that of a synchronization mechanism shown in FIG. 1.

FIG. 7 shows a synchronization mechanism for bearing housings according to a further embodiment of the present invention. Although a single shaft 16 is used in the embodiment of FIG. 1, in the embodiment of FIG. 7, shafts 16a and 16b are used for the left-side and right-side bearing housings, respectively. The shafts 16a and 16b are disposed in spaced parallel relation to the pressure roll 2, and have outer end portions thereof rotatably supported on the side plates 20 through rolling bearings 47. The outer ends of the extension arms 17 are attached through the spherical bearings 18 to the shafts 16a and 16b. As in the case of FIG. 1, a bearing having a spherical seat other than a spherical bearing, for example, a self-aligning ball bearing may be used, instead of the spherical bearing 18.

A single synchronizing rod 48 is provided in spaced parallel relation to the shafts 16a and 16b. The rod 48 has opposite end portions thereof rotatably supported through rolling bearings 49 on the side plates 20. Two lateral, right and left, levers 50 are fixed to the rod 48 and extend toward the lateral bearing housings. A shaft extending in a lateral direction is attached to an outer end portion of each lever 50. A roller 51 is provided at a distal end of this shaft.

On the other hand, two lateral, right and left, levers 52 extend from the outer end portions of the extension arms 17 toward the rod 48. Proximal ends of the levers 52 are fixed to the extension arms 17 by means of bolts. A distal end of each lever 52 has two fingers 53. The roller 51 is accommodated in a space between these fingers 53.

The lateral, right and left, levers 50 on the rod 48 are adjusted to the same angular positions. A link mechanism comprising the levers 50, the rollers 51 and the levers 52 is capable of synchronizing pivotal movements of the lateral bearing housings through the synchronizing rod 48.

FIG. 8 shows an entire arrangement of a laminator according to an embodiment of the present invention. The laminator shown in FIG. 8 is an auto-cut laminator for adhering resist films to opposite surfaces of a substrate 1 for a print circuit board under pressure. The substrate 1 is transferred by a roller conveyor 54 and, just before the substrate 1 enters an area between a pair of pressure rolls 2, the substrate 1 is stopped. When resist films 55 are unwound from film rolls 56, a cover film 57 is peeled off from a surface of each resist film 55, and each resist film 55 is guided toward the substrate 1 with a resist side thereof facing the substrate 1. A leading end of each resist film 55 is pre-adhered to a front edge of the substrate 1. The substrate 1 is supplied to the area between the pressure rolls 2, with the resist films 55 being pre-adhered to the front edges of the substrate 1. Meanwhile, each resist film 55 is unwound from the film roll 56 and the cover film 57 is rolled up in a roll form 58. While the resist films 55 are laminated on the substrate 1 between the pressure rolls 2 which are rotating, each resist film 55 is cut in a predetermined length corresponding to the length of the substrate 1. Thus, film sheets having predetermined lengths are laminated on the substrate 1 by continuous operation.

The present invention is also applicable to a manually operated laminator.

What is claimed is:

1. A laminator for laminating a film on a substrate, comprising:

a pair of pressure rolls adapted to have the substrate and the film sandwiched therebetween;

bearings adapted to rotatably support end portions of each of the pressure rolls, each of the bearings comprising a bearing housing;

a lever having one end attached to the bearing housing and the other end located inward of the bearing in an axial direction of the pressure roll; and a pressure-applying apparatus for applying force to the other end of the lever, to thereby apply pressure through the bearing to the substrate and the film between the pair of pressure rolls, and generate bending moment which tends to cause the pair of pressure rolls to be projected toward each other, wherein the laminator further comprises:

a shaft for supporting the bearings, the shaft being disposed in spaced parallel relation to the pressure roll; and extension arms formed in the bearing housings and connected to the shaft so that the bearing housings are capable of pivotal movement about the axis of the shaft and also capable of pivotal movement about an axis perpendicular to the axis of the shaft.

2. The laminator according to claim 1, wherein the bearing housings are connected to the shaft through bearings having spherical seats.

3. The laminator according to claim 1, wherein:

the shaft has opposite end portions thereof rotatably supported on side plates through rolling bearings; and a synchronization mechanism is provided between the shaft and the extension arms connected thereto for restraining relative rotation between the shaft and the extension arms so as to synchronize movements of the bearing housings on opposite ends of the pressure roll during pivotal movement of the bearing housings about the axis of the shaft.

4. The laminator according to claim 1, wherein:

a roller is provided on the other end of the lever;

a bar in contact with the roller and extending in the axial direction of the pressure roll is provided; and the pressure-applying apparatus is provided outward of the bearing housing in the axial direction of the pressure roll and adapted to apply force to the roller on the other end of the lever in an indirect manner by applying force to the bar at a position in which the pressure-applying apparatus is provided.

5. The laminator according to claim 4, wherein a plurality of openings are formed in the lever for receiving and supporting a shaft of the roller in a selective manner, the plurality of openings being arranged in the axial direction of the pressure roll, whereby a position of application of force to the roller can be changed by selecting one of the openings.

6. The laminator according to claim 4, wherein:

the bar has an I-shaped cross-section;

two levers extend from the bearing housing along opposite sides of a web portion of the I-shaped bar;

the roller provided on the other end of each of the two levers is located between two flange portions of the I-shaped bar on each of the opposite sides of the web portion of the I-shaped bar; and the web portion of the I-shaped bar includes a slot formed therein for enabling a shaft connecting the two rollers provided on the opposite sides of the web portion to extend therethrough.

7. The laminator according to claim 4, wherein:

the bar comprises a hollow bar having a rectangular outer configuration, the hollow bar including a longitudinally extending opening formed in at least a side wall thereof facing the pressure roll;

the rollers are provided one on each of opposite sides of the other end of the lever, the other end of the lever extending from the opening to an inside of the hollow bar; and the rollers are provided one on each of opposite sides of the opening inside the hollow bar.

8. The laminator according to claim 1, wherein:

the bearing housing comprises an outer first bearing housing element and an inner second bearing housing element;

the first bearing housing element comprises the extension arm and has a C-shaped opening for receiving the second bearing housing element;

the lever is attached to the first bearing housing element;

the second bearing housing element located on a side on which a drive mechanism for the pressure roll is provided comprises a plurality of rolling bearings for supporting an end shaft of the pressure roll, a gear provided axially outward of the rolling bearings and having a hollow shaft in which an outer end of the end shaft is fitted so that the hollow shaft and the outer end of the end shaft are rotatable as a single unit, and a plurality of rolling bearings for supporting the hollow shaft, the second bearing housing element being capable of being fixed in the C-shaped opening of the first bearing housing element; and the second bearing housing element on a side thereof opposite to the side on which the drive mechanism is provided comprises a plurality of rolling bearings for supporting an end shaft of the pressure roll, and is capable of being fixed in the C-shaped opening of the first bearing housing element.

9. The laminator according to claim 4, wherein a holding member engageable with the bar is provided in the lever or the bearing housing separately from the roller provided on the other end of the lever, so as to maintain a position of the bearing housing when the pressure roll is removed from the bearing housing.

10. The laminator according to claim 1, wherein:

the shaft for supporting the bearings is provided for each of the bearing housings;

each of the shafts has an outer end thereof supported on the side plate through a rolling bearing;

each of the shafts has an inner end thereof connected to an end portion of the extension arm;

a synchronizing rod is provided in spaced parallel relation to the shafts, the synchronizing rod having opposite ends thereof rotatably supported on the side plates through rolling bearings; and the synchronizing rod and the end portions of the extension arms connected to the shafts are connected to each other through a link mechanism so that the bearing housings on opposite ends of the pressure roll move in synchronism with each other when the bearing housings pivotally move about the axes of the shafts.

* * * * *